(12) United States Patent
Wallach et al.

(10) Patent No.: US 10,390,546 B2
(45) Date of Patent: Aug. 27, 2019

(54) APPARATUS WITH REMOVABLE REUSABLE PRESSURIZED AIRTIGHT CONTAINER

(71) Applicants: Robert J. Wallach, San Jose, CA (US); Kurt M. Jorgensen, San Carlos, CA (US)

(72) Inventors: Robert J. Wallach, San Jose, CA (US); Kurt M. Jorgensen, San Carlos, CA (US)

( * ) Notice: Subject to any disclaimer, the term of this patent is extended or adjusted under 35 U.S.C. 154(b) by 382 days.

(21) Appl. No.: 15/181,417

(22) Filed: Jun. 14, 2016

(65) Prior Publication Data

US 2016/0374361 A1    Dec. 29, 2016

Related U.S. Application Data

(60) Provisional application No. 62/180,051, filed on Jun. 16, 2015.

(51) Int. Cl.
*A23F 5/10*    (2006.01)
*B65B 31/04*    (2006.01)
(Continued)

(52) U.S. Cl.
CPC ............ *A23F 5/105* (2013.01); *B65B 31/047* (2013.01); *B65D 43/16* (2013.01); *B65D 81/2076* (2013.01)

(58) Field of Classification Search
CPC ....... A23F 5/105; B65B 31/047; B65D 43/16; B65D 81/2076
USPC ........... 99/295, 300, 467–469, 473; 222/152, 222/399, 53, 105, 129, 185.1, 209, 387, 222/394, 396, 400.7, 425, 438, 445, 449, 222/450, 544, 94; 220/203.28, 203.19, 220/582, 581, 326, 324, 315, 849, 810;
(Continued)

(56) References Cited

U.S. PATENT DOCUMENTS

| 9,790,076 | B2 * | 10/2017 | Novak | ...................... A23L 2/54 |
| 2010/0263545 | A1 * | 10/2010 | Morgan | ................ A47J 31/005 99/295 |
| 2018/0192815 | A1 * | 7/2018 | Vastardis | ............ A47J 31/4403 |

* cited by examiner

*Primary Examiner* — Dana Ross
*Assistant Examiner* — Joseph M Baillargeon

(57) ABSTRACT

One embodiment of an apparatus with mobile reusable airtight container assembly (10) which utilizes pressurized inert gas or CO2 gas for long term preservation of the freshness of roasted coffee beans or grounds in terms of aroma and taste, utilizes a system of an electronic controller (250), pressure switch (170), gas delivery valve (180), check valve (50) and vent valve (160) to create a pressurized environment of inert gas or CO2 gas and low residual oxygen and moisture concentrations within the airtight container assembly (10). An airtight lid (20) with pressure seal (220) covers the airtight container assembly (10) and creates a reusable system whereby the user can remove a portion of the roasted coffee beans or grounds as often as needed in order to brew coffee without degrading the long term freshness of the roasted coffee beans or grounds stored within the airtight container assembly (10). A two stage opening mechanism (40) prevents uncontrolled opening of the airtight lid (20) while the airtight container assembly (10) is pressurized. The check valve (50) enables the mobile aspect whereby the airtight container assembly (10) can be removed from and replaced back on a control system (260) as many times as desired by the user, while maintaining the optimum storage condition of pressurized inert gas or CO2 gas with low residual oxygen and moisture concentrations.

4 Claims, 9 Drawing Sheets

(51) Int. Cl.
*B65D 43/16* (2006.01)
*B65D 81/20* (2006.01)

(58) Field of Classification Search
USPC ........ 261/64.1, 64.3, 65; 215/311, 307, 284, 215/280, 273
See application file for complete search history.

APPARATUS WITH REMOVABLE REUSABLE PRESSURIZED AIRTIGHT CONTAINER

CROSS-REFERENCE TO RELATED APPLICATIONS

This application claims the benefit of provisional patent application Ser. No. 62/180,051, filed 2015 Jun. 16 by the present inventors.

BACKGROUND

This application relates to an apparatus with an airtight container assembly that can be pressurized with gas and is mobile and reusable. Particularly, the apparatus can be applied to preserving the freshness of roasted coffee beans or grounds.

PRIOR ART

The following is a tabulation of some prior art that presently appears relevant:

| Pat. No. | Issue Date | Patentee |
| --- | --- | --- |
| | U.S. Patent | |
| 6,337,098 | 2002 Jan. 8 | Spencer, et al. |
| | Foreign Patents | |
| EP1879487 B1 | 2008 Aug. 20 | Illy, Francesco |

NONPATENT LITERATURE DOCUMENT

Illy, et al., Espresso Coffee, The Science of Quality, Elsevier Academic Press, 2011.

Fresh roasted coffee beans or grounds exhibit a pleasant aroma and produce brewed coffee that has a fine aroma and taste. Unfortunately, when exposed to air as is the case when stored in commonly available bags or containers, the fresh roasted coffee beans or grounds will experience degradation, known as staling, of their pleasant aroma and ability to produce a high quality aroma and taste in brewed coffee. This staling takes place over a relatively short period of time, typically on the order of two weeks after the roasting process is completed.

Staling, is due to several chemical and physical changes that take place within the fresh roasted coffee beans or grounds upon exposure to air. A very good description of the mechanisms responsible for staling as well as conditions under which the staling rate can be significantly reduced, is given by Nicoli and Savonitti, Espresso Coffee, pages 230-255. The two most prominent mechanisms pointed out by Nicoli and Savonitti as being responsible for the staling of freshly roasted coffee beans or grounds when exposed to air, are:
1. The release of volatile aroma compounds and CO2, which were formed during the roasting process, from the coffee beans or grounds.
2. Oxidation of volatile aroma compounds and lipids within the coffee beans or grounds.

The best technique for reducing the rate of staling of fresh roasted coffee beans or grounds, as pointed out by Savonitti, Espresso Coffee, page 253 Table 6.6, is storage under pressure with low residual oxygen concentration.

SUMMARY

In accordance with one embodiment, an apparatus with a mobile reusable airtight container assembly that can be subjected to an automated procedure of pressurization and vent cycles with a final pressurization step utilizing inert gas or CO2 gas in order to obtain the optimum storage condition for fresh roasted coffee beans or grounds of pressurized inert gas or CO2 gas and a specific low concentration of oxygen along with low moisture concentration, is used to maintain freshness of roasted coffee beans or grounds. The apparatus comprises an airtight container assembly of sufficient volume to store amounts of fresh roasted coffee beans or grounds typically required by consumers or commercial users, an airtight lid for the airtight container assembly, a latch or means for connecting the airtight lid with the airtight container assembly, a safety mechanism for the latch requiring a two stage opening motion that prevents uncontrolled opening of the airtight lid by venting the pressurized inert gas or CO2 gas from the airtight container assembly after the first stage motion before fully opening the airtight lid in the second stage motion in case of accidental opening while the airtight container assembly is pressurized, a high pressure supply of inert gas or CO2 gas connected to the airtight container assembly, a check valve that can be engaged for the purposes of allowing two way gas flow and pressure sensing in order to perform the automated sequence of pressurization and vent cycles with a final pressurization step, and disengaged to allow sealing in order to maintain pressure while allowing for mobility of the airtight container assembly, a control system to automatically and consistently perform the sequence of pressurization and vent cycles with a final pressurization step that creates the optimum storage condition within the airtight container of pressurized inert gas or CO2 gas and a specific low concentration of oxygen along with low moisture concentration, as frequently as required by the user due to opening the airtight container assembly in order to fill the airtight container assembly with fresh roasted coffee beans or grounds, or to remove a portion of the roasted coffee beans or grounds in order to brew coffee, levers or latches which constitute means to secure the airtight container assembly to the control system, a protruding feature at the interface of the control system and airtight container assembly which constitutes means to engage and activate the check valve for pressure sensing and two way gas flow when the airtight container assembly is secured to the control system. These features enable the user to keep their fresh roasted coffee beans or grounds stored at the optimum condition, thus maintaining freshness in terms of aroma and taste for a significantly longer period of time than is possible with conventional storage means. The apparatus is simple to use and has few moving parts, thus is reliable and cost effective.

Advantages

From the description above, a number of advantages of some embodiments of the present apparatus with mobile reusable airtight container assembly that utilizes pressurized gas for maintaining freshness of roasted coffee beans or grounds become evident:
(a) The apparatus can store roasted coffee beans or grounds under pressurized inert gas or CO2 gas with low residual oxygen and moisture concentrations. This counteracts the staling mechanisms described above since pressure reduces the rate of outgassing of volatile aroma compounds and CO2 from the roasted coffee beans or grounds and the low residual oxygen and moisture concentrations reduce the rate oxidation of the volatile aroma compounds and lipids within the roasted coffee beans or grounds, thus significantly reducing the rate of staling of fresh roasted coffee beans or grounds.

(b) The apparatus automatically performs the sequence of pressurization and vent cycles with a final pressurization step which enables consistent and repeatable performance for the optimum storage condition for fresh roasted coffee beans or grounds of pressurized inert gas or CO2 gas and a specific low concentration of oxygen along with low moisture concentration.

(c) The apparatus allows for safe usage of the airtight container assembly which operates with pressurized inert gas or CO2 gas. This is enabled by the unique latch assembly design which requires a two stage opening motion that vents the pressurized inert gas or CO2 gas from the airtight container assembly in the first stage of latch motion, then allows the user to fully open the airtight lid in the second stage of latch motion. This prevents uncontrolled opening of the airtight container assembly in case of accidental opening while the airtight container assembly is pressurized due to a user not following the proper operating procedure of venting the airtight container assembly prior to opening.

(d) The mobility for the airtight container assembly enabled by the check valve that can be engaged to enable pressure sensing and two way gas flow in order to perform the automated gas pressurization and vent sequence with a final pressurization step, and disengaged to allow sealing in order to maintain pressure when removing the airtight container assembly from the control system allows for storage of as much fresh roasted coffee beans or grounds as desired by the user through the use of multiple airtight container assemblies.

(e) The mobility enabled by the check valve described in section (c) above also will enable the user to purchase fresh roasted coffee beans or grounds at a coffee house of their choosing and have these transferred into an airtight container assembly or several airtight container assemblies at the coffee house, then processed to the optimum storage condition of pressurized inert gas or CO2 gas and low residual oxygen and moisture concentrations by a control system and inert gas or CO2 tank that can be located at any coffee house, in order to transport the newly purchased fresh roasted coffee beans or grounds to their place of usage such as the home or office, without loss of freshness.

(f) Since the mobile airtight container assembly is reusable, the user can open the airtight container assembly often as desired to remove a portion of the roasted coffee beans or grounds in order to brew coffee that will have high quality aroma and taste. This is very cost effective in that the user is no longer restricted to purchasing brewed coffee at a high end coffee house in order to drink fresh coffee with high quality aroma and taste. Another cost effective aspect of the present apparatus is that there will be no need to discard roasted coffee beans or grounds that were not used before becoming stale. The apparatus is also efficient from a time perspective since the consumer can brew fresh coffee at their home or office, as frequently as desired, that will have high quality aroma and taste, thus removing the requirement for the consumer to visit a high end coffee house each time they wish to enjoy fresh brewed coffee with high quality aroma and taste.

DRAWINGS

Figures

Figure 1:
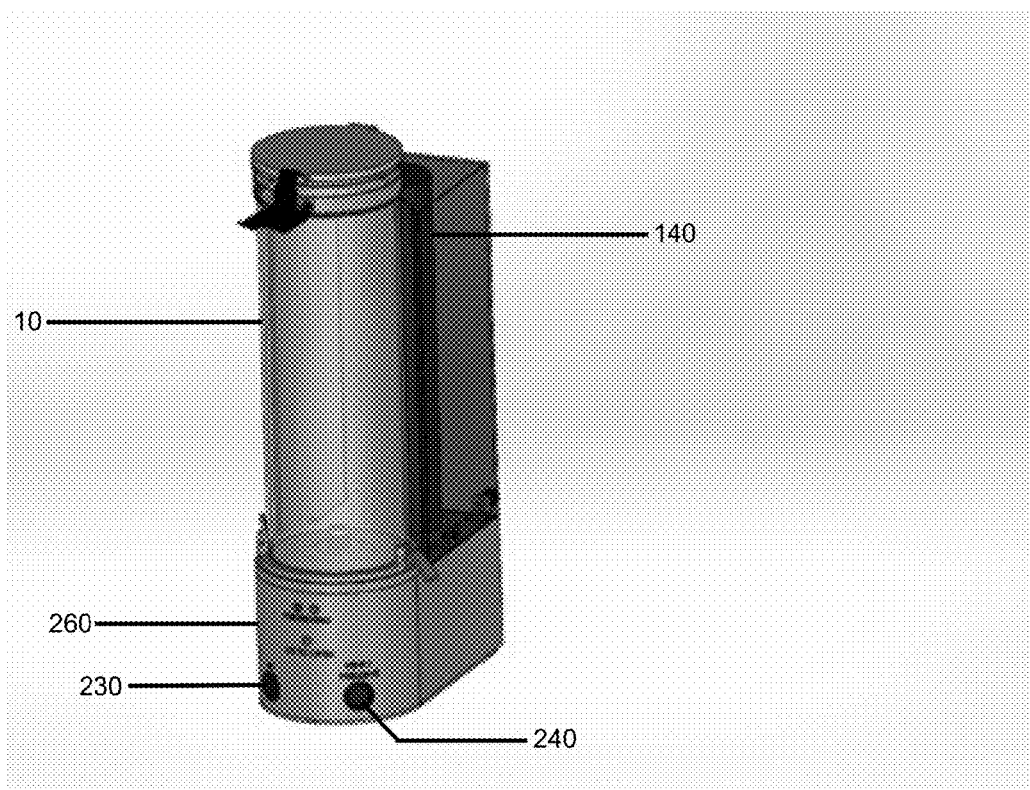
FIG. 1 is a perspective view of the apparatus with mobile reusable airtight container assembly which utilizes pressurized gas to maintain freshness of roasted coffee beans or grounds in accordance with one embodiment.

REFERENCE NUMERALS 10 airtight container assembly
11 airtight container body
20 airtight lid
30 lid connection mechanism
40 two stage opening mechanism
41 latch lever
42 latch hook
43 lever-latch connector rod
44 latch pivot guide
45 latch pivot pin
46 latch mounting bands
50 check valve
60 check valve body
70 check valve bolt
80 check valve nut
90 check valve spring
100 check valve inner seal
110 check valve outer seal
130 control system interface plate
135 pivot
136 lever
140 tank for inert gas or CO2
150 pressure regulator
160 vent valve
170 pressure switch
180 gas delivery valve
190 gas delivery line
195 gas vent line 200 tube
210 filter
220 pressure seal
230 on/off power switch
240 control switch
250 electronic controller
260 control system

DETAILED DESCRIPTION

FIGS. 1 Through 7—First Embodiment

FIG. 1 is a perspective view of one embodiment of the apparatus with mobile reusable airtight container assembly (10) which utilizes pressurized gas to maintain freshness of roasted coffee beans or grounds. The apparatus has an airtight container assembly (10) for holding roasted coffee beans or grounds in the optimum storage environment of pressurized inert gas or $CO_2$ gas and low residual oxygen and moisture concentrations. The airtight container assembly (10) is mounted on a control system (260) which also houses a tank for inert gas or $CO_2$ (140). In other embodiments larger tanks for inert gas or $CO_2$ can be located outside of the control system (260). Also shown on the control system in FIG. 1 are an on/off power switch (230) and control switch (240).

Figure 2:
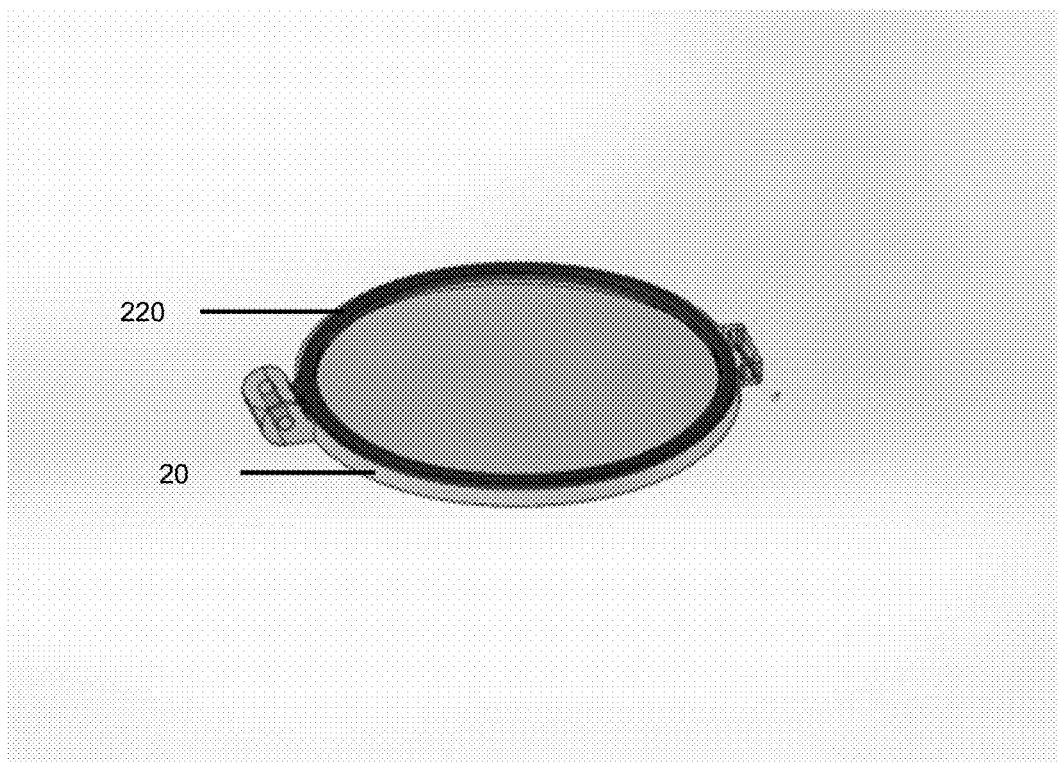
FIG. 2 is a bottom perspective view of the airtight lid and a pressure seal that is contained within a groove in the airtight lid in accordance with one embodiment.

FIG. 2 is a bottom perspective view of the airtight lid (20) and a pressure seal (220) that is contained within a groove in the airtight lid (20). The pressure seal (220) constitutes a means for repeatedly creating an airtight seal between the airtight lid (20) and the airtight container body (11). The airtight lid (20) of one embodiment is made of aluminum, however the airtight lid (20) can be made of other suitable rigid materials such as glass, plastic, stainless steel or tinplate which are able to safely tolerate the operating pressure range of 1.1-2.2 atmospheres. The pressure seal (220) of one embodiment is an o-ring made from a typical o-ring material such as viton. In other embodiments the pressure seal (220) can be made of other suitable materials such as silicone rubber and can have other suitable shapes such as a gasket. In other embodiments, the pressure seal (220) can be located at the top edge of the airtight container body (11).

Figure 3:
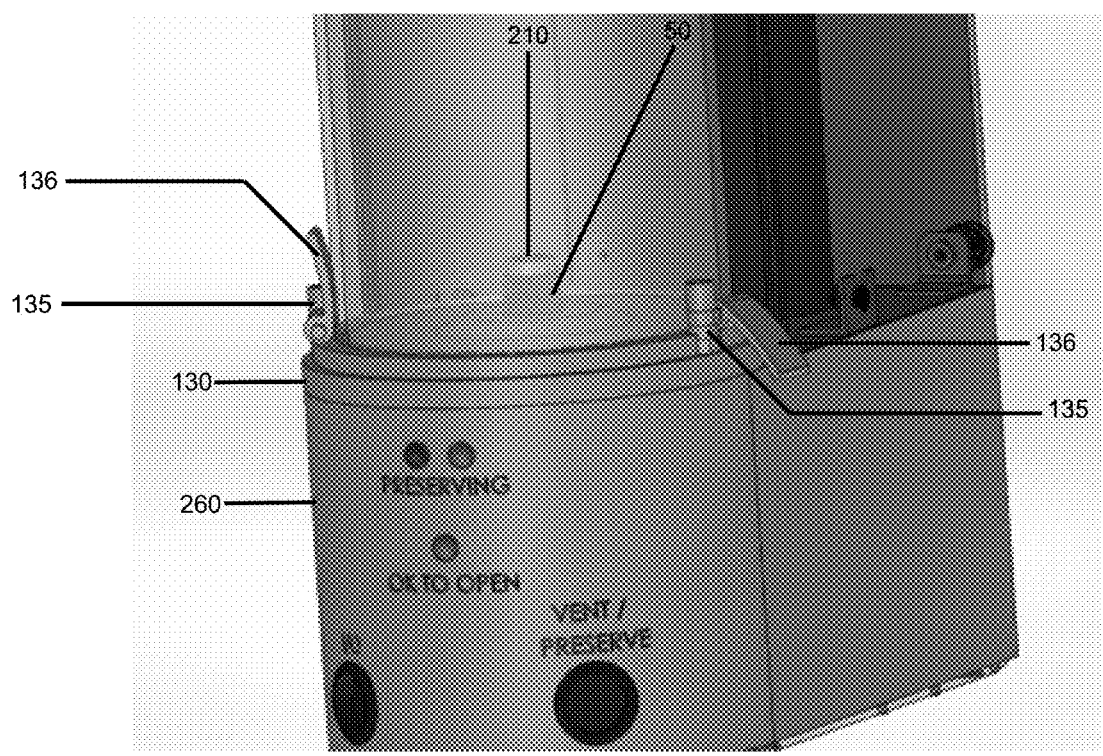
FIG. 3 is a perspective view of the airtight container assembly mounted on the control system in accordance with one embodiment.

FIG. 3 is a perspective view of the control system (260) and the airtight container assembly (10) mounted on the control system (260). Two securing mechanism assemblies of one embodiment are mounted on the control system (260) and are comprised of a pivot (135) and a lever (136). In other embodiments the securing mechanism assemblies can have alternate designs such as a latch. There is a filter (210) installed on the top of check valve (50). The check valve (50) is mounted in contact with the control system interface plate (130) that has a raised area in alignment with the center of the check valve (50).

Figure 4:
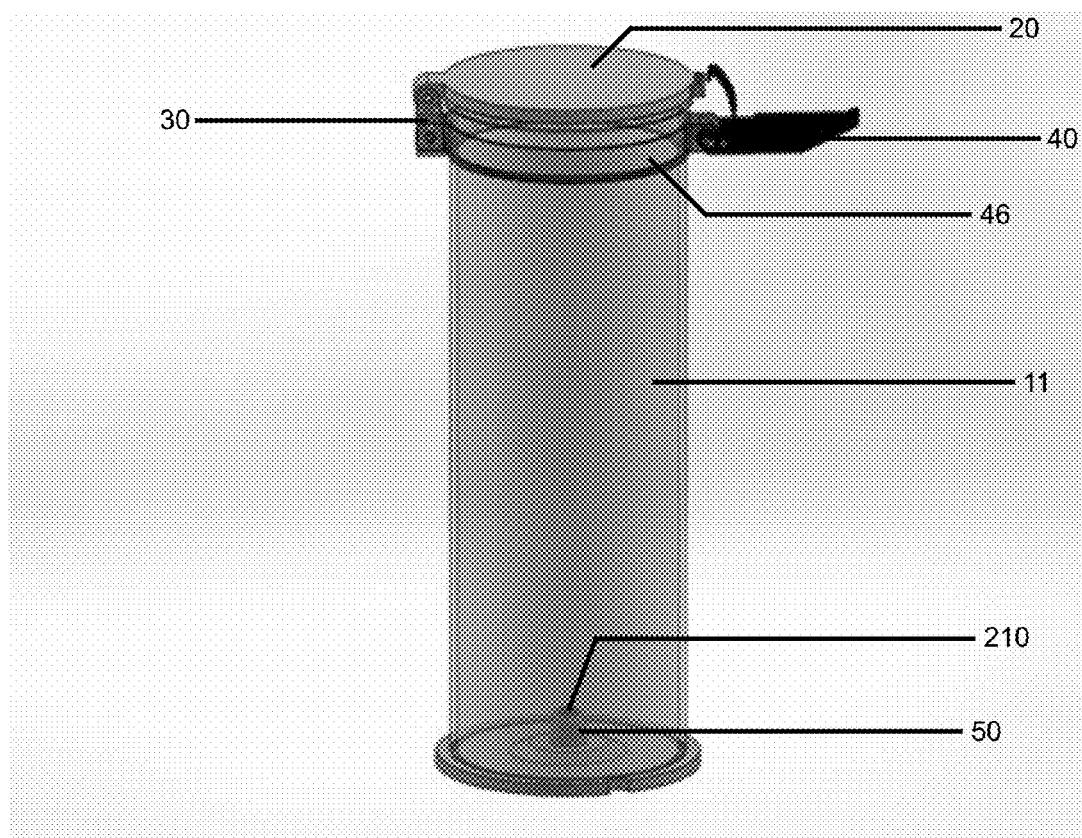
FIG. 4 is a perspective view of the airtight container assembly in accordance with one embodiment.

FIG. 4 is a perspective view of the airtight container assembly (10) comprising airtight container body (11) and airtight lid (20) which is attached to the airtight container body (11) by the lid connection mechanism (30). The two stage opening mechanism (40) is attached to the latch mounting bands (46) near the top of the airtight container body (11). The check valve (50) and filter (210) are installed at the bottom of the airtight container body (11). The airtight container body (11) of one embodiment is made of a rigid plastic material, such as polycarbonate, which is able to safely tolerate the operating pressure range of 1.1-2.2 atmospheres and is compatible with the storage of roasted coffee beans or grounds. In other embodiments the airtight container body (11) can be made of other suitable materials such as glass, aluminum, stainless steel or tinplate.

Figure 5A:
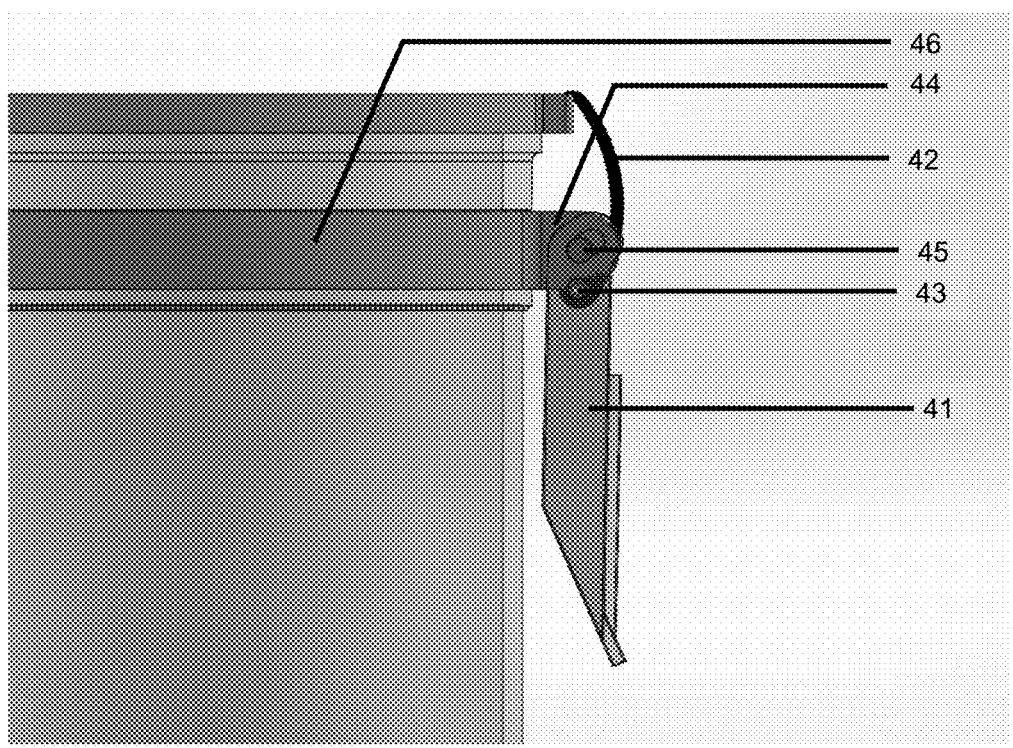
FIG. 5a is a side view of the two stage opening mechanism in the closed position in accordance with one embodiment.

FIG. 5a is a side view of one embodiment of the two stage opening mechanism (40) comprising a latch lever (41) shown in the closed position, latch hook (42), lever-latch connector rod (43), latch pivot guide (44), latch pivot pin (45) and latch mounting bands (46).

Figure 5B:
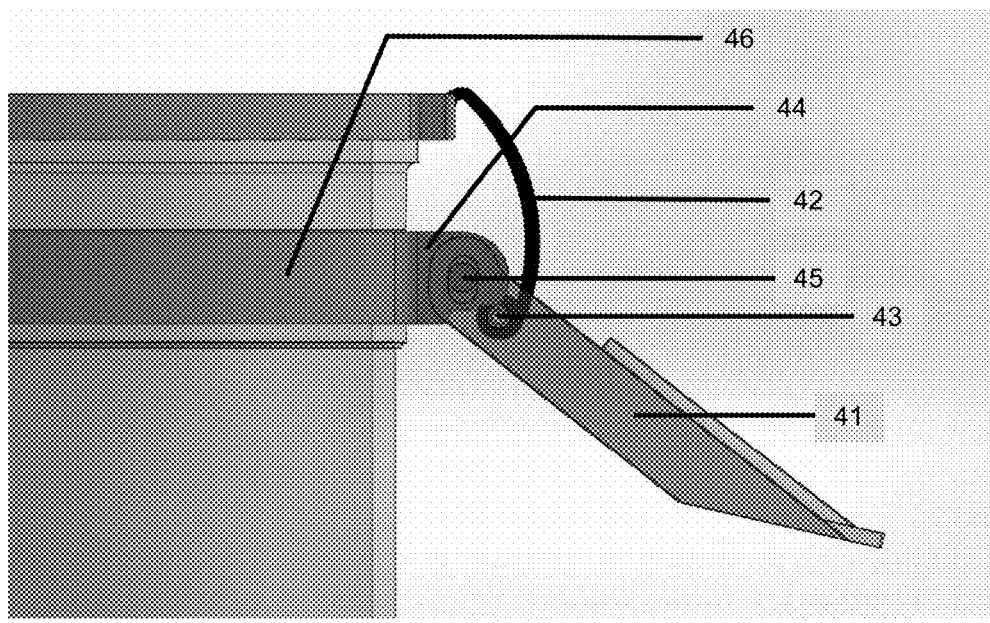
FIG. 5b is a side view of the two stage opening mechanism in the first stage open position in accordance with one embodiment.

FIG. 5b is a side view of one embodiment of the two stage opening mechanism (40) showing the latch lever (41), in the first stage open position with lever-latch connector rod (43) at the stop ledge feature in the latch mounting bands (46).

Figure 5C:
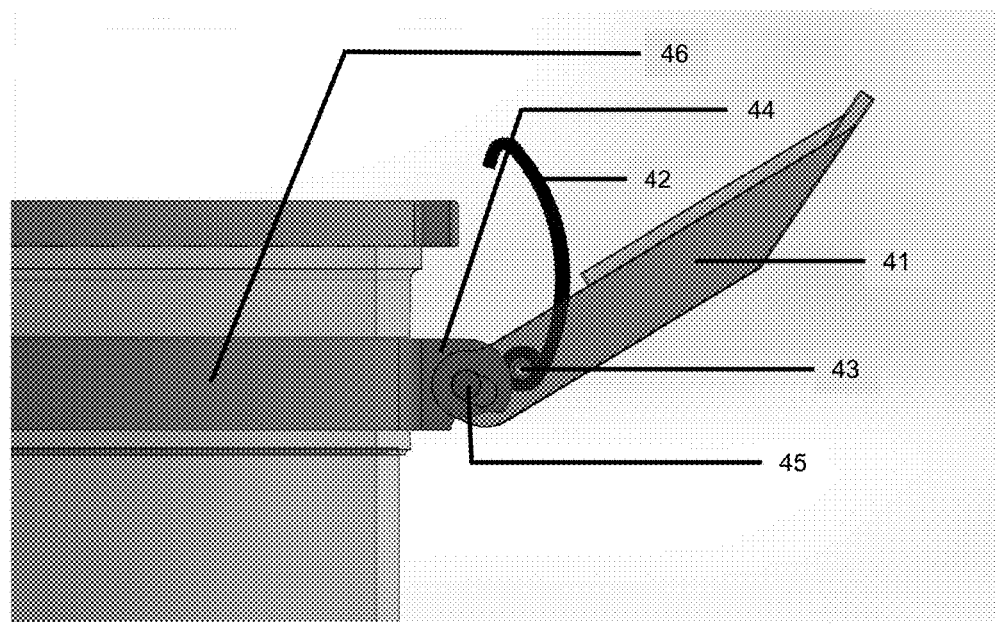
FIG. 5c is a side view of the two stage opening mechanism in the full open position in accordance with one embodiment.

FIG. 5c is a side view of one embodiment of the two stage opening mechanism (40) showing the latch lever (41) in its fully open position with the latch pivot pin (45) at the top of the slotted area of the latch lever (41).

Figure 6:
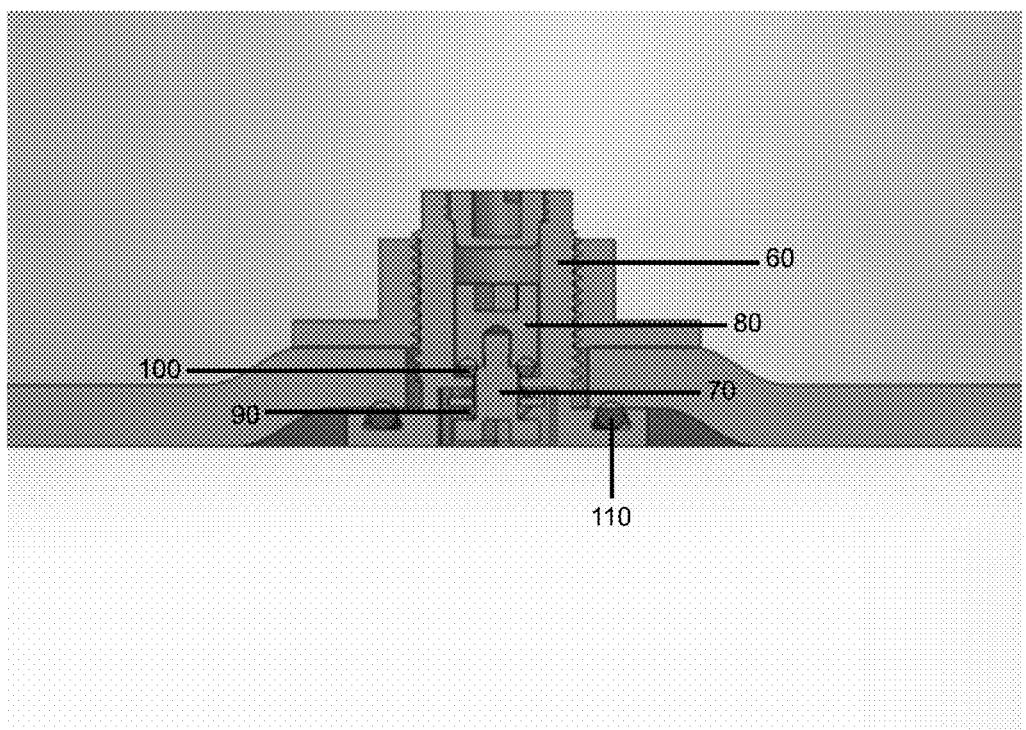
FIG. 6 is a cross-section view of the check valve that can be engaged to enable pressure sensing and two way gas flow in order to perform the automated gas pressurization and vent sequence and disengaged to allow sealing in order to maintain pressure when removing the airtight container from the control system in accordance with one embodiment.

FIG. 6 is a cross sectional view of one embodiment of the check valve (50). The check valve (50) is constructed of a check valve body (60), inside of which there are a check valve bolt (70) which is connected to a check valve nut (80). There is a check valve spring (90) located under the head of the check valve bolt (70), a check valve inner seal (100) located above the check valve nut (80), and a check valve outer seal (110) located below the head of the check valve body (60).

Figure 7:
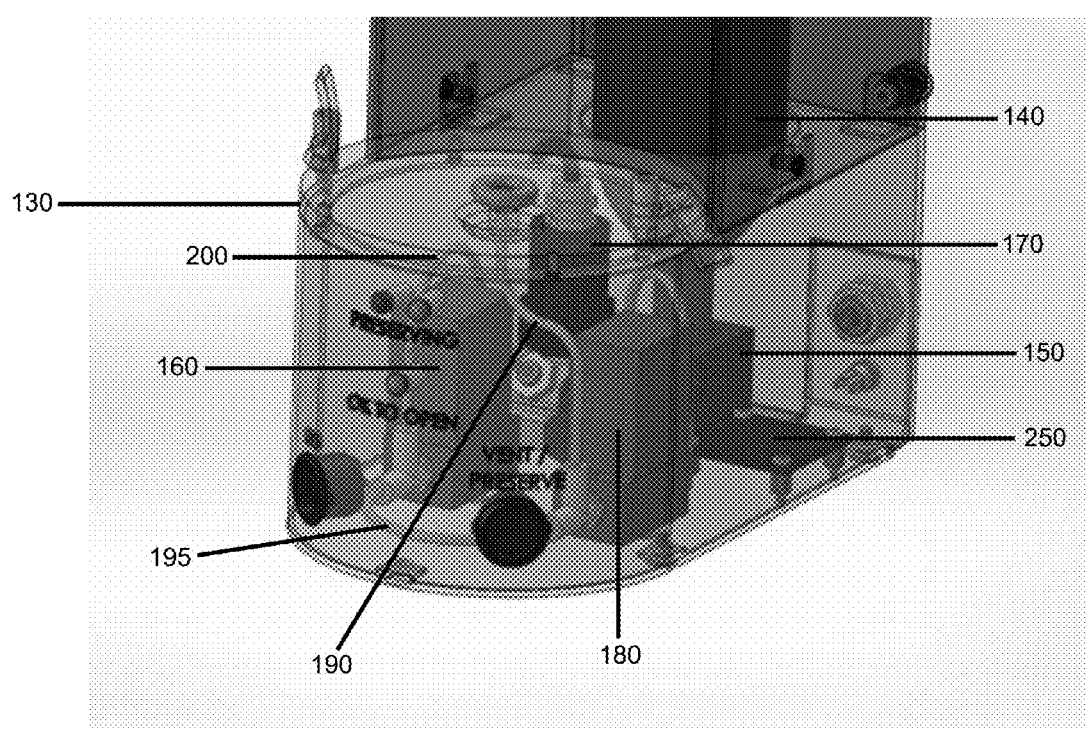
FIG. 7 is a perspective view of the control system in accordance with one embodiment.

FIG. 7 is a perspective view of the control system (260). An electronic controller (250) is shown mounted to the bottom of the control system (260). The bottom side of the control system interface plate (130) opposite the interface with check valve (50) show in FIG. 3 is connected to a gas delivery line (190) which is connected by a tee connection on one side to a gas vent line (195) and a vent valve (160) and on the other side to a gas delivery valve (180) and a pressure regulator (150). The pressure regulator (150) is connected to a tank for inert gas or $CO_2$ (140). Another tee connection upstream of vent valve (160) is connected to a tube (200) which is connected to a pressure switch (170).

Operation

The manner of using the apparatus with mobile reusable airtight container assembly (10) which utilizes pressurized gas to maintain freshness of roasted coffee beans or grounds, shown in FIG. 1, is to fill the airtight container assembly (10) with fresh roasted coffee beans or grounds, then close and secure the airtight lid (20) with the two stage opening mechanism (40). The airtight lid (20) contains a pressure seal (220) that is compressed by a downforce from the airtight lid (20) when secured by the two stage opening mechanism (40). This sealing system creates a seal that is capable of preventing pressurized inert gas or $CO_2$ gas from leaking out of the airtight container assembly (10) over the operating pressure range of 1.1-2.2 atmospheres. This ability to maintain a pressurized inert gas or $CO_2$ gas environment offers significant benefits for maintaining the freshness of roasted coffee beans or grounds in terms of aroma and taste. First, the pressurized environment reduces the diffusion forces which drive the release of volatile aroma compounds and $CO_2$ from roasted coffee beans or grounds under normal atmospheric conditions. Also, the pressurized environment allows for a larger portion of the volatile aroma compounds to be dissolved in the lipid phase or to bind to melanoidins within the roasted coffee beans or grounds. This aspect also helps to create a smooth body in the resultant brewed coffee.

The airtight container assembly (10) is placed on the control system (260) and secured in place by rotating the levers (136) about the pivots (135) by 90 degrees such that the levers (136) will be above the bottom section of the airtight container assembly (10). The levers (136) are then rotated downward. The levers (136) have an off center rotation point (not shown) that allows for tightening and loosening against the bottom section of the airtight container assembly (10). With the levers (136) in the down position, the airtight container assembly (10) is secured to the control system baseplate (130) with sufficient force for the raised area on the control system baseplate (130) to open the check valve (50). With the check valve (50) open, gas can flow in and out of the airtight container assembly (10) when commanded to do so by the control system (260). Also, the pressure within the airtight container assembly (10) can be sensed through the open check valve (50) by the pressure switch (170).

Set the on/off power switch (230) to the "On" position. Then set the control switch (240) to the "Preserve" position. This signals the control system (260) to automatically run a series of pressurization and vent steps with a final pressurization step. Each pressurization step consists of pressurizing the airtight container assembly (10) with inert gas or CO2 gas up to a preset pressure P1 that is between 1.1-2.2 atmospheres as determined by the pressure switch (170). The pressurization steps occur when the gas delivery valve (180) is opened, thus allowing pressurized inert gas or CO2 gas from the tank for inert gas or CO2 (140) to flow through the pressure regulator (150), gas delivery line (190), check valve (50) and filter (210) into the airtight container assembly (10). Each vent step consists of venting the inert gas or CO2 gas along with air from the airtight container assembly (10) down to a 2nd preset pressure P2, where 1 atmosphere<P2<P1, that can be determined by the pressure switch (170) or a timed vent step. The vent steps occur when the gas delivery valve (180) is closed and vent valve (160) is opened, thus allowing the inert gas or CO2 gas along with air to exit the airtight container assembly (10) through the filter (210), check valve (50), gas delivery line (190) and vent valve (160). The filter (210) prevents transport of debris, such as coffee grounds, that could disrupt function, into the gas transport system which includes the check valve (50), gas delivery valve (180), vent valve (160), pressure regulator (150) and pressure switch (170). This sequence of pressurization and vent steps is repeated a specific number of times followed by a final pressurization step, all of which are pre-programmed into the electronic controller (250). Pressurization of the airtight container assembly (10) with inert gas or CO2 gas causes a reduction of the oxygen and moisture concentrations within the airtight container assembly (10) that is proportional to the level of pressurization. Venting of the inert gas or CO2 gas along with air and repeating the pressurization causes a further reduction of the oxygen and moisture concentrations within the airtight container assembly (10). Repeating this pressurization and vent sequence a specific number of times, with the final step being pressurization, results in the optimum storage condition for fresh roasted coffee beans or grounds within the airtight container assembly (10) of pressurized inert gas or CO2 gas between 1.1-2.2 atmospheres, a specific low oxygen concentration between 0.1%-4% and a commensurate several fold reduction in moisture concentration. This ability to create a pressurized inert gas or CO2 environment and to reduce the residual oxygen concentration to a specified level and significantly reduce the moisture concentration within the airtight container assembly (10) offers significant benefits to maintaining freshness of roasted coffee beans or grounds in terms of aroma and taste since the pressurized environment reduces the diffusion forces which drive the release of volatile aroma compounds and CO2 from roasted coffee beans or grounds and the low oxygen and moisture concentrations greatly reduce the rate of oxidation of the volatile aroma compounds and lipids within roasted coffee beans or grounds.

In order to remove a portion of the roasted coffee beans or grounds from the airtight container assembly (10) for brewing coffee, the control switch (240) is set to the "Vent" position. This signals the electronic controller (250) to activate vent valve (160) which releases the pressurized inert gas or CO2 gas from the airtight container assembly (10). A timer on the electronic controller (250) allows sufficient time for the pressure in the airtight container assembly (10) to reach atmospheric pressure and then signals the electronic controller (250) to stop the vent procedure by closing vent valve (160). At this time the airtight lid (20) may be opened. The user opens airtight lid (20) by disengaging the two stage opening mechanism (40) and removes the desired portion of roasted coffee beans or grounds for brewing coffee.

To disengage the two stage opening mechanism (40), the user lifts up on the latch lever (41). This first stage motion causes the lever-latch connector rod (43) to move outward along a notched area in the latch mounting bands (46) until it reaches a stop ledge feature as shown in FIG. 5b. At this position, a small opening is created between the airtight lid (20) and the airtight container body (11) that allows the pressurized inert gas or CO2 gas to leak out safely in case the user has forgotten to vent the airtight container assembly (10) prior to opening the airtight lid (20). The user then continues to lift latch lever (41) in a second stage motion which causes a slotted area in latch lever (41) to move in a downward pivoting motion that is guided by latch pivot pin (45). Concurrently, the lever-latch connector rod (43) moves outward away from the airtight container body (11) until it passes the stop ledge feature on the mounting bands (46) and reaches its fully open position as shown in FIG. 5c.

Once the desired amount of roasted coffee beans or grounds have been removed, the user can close the airtight lid (20), secure the two stage opening mechanism (40) and set control switch (240) to the "Preserve" position in order to once again run the automated series of pressurization and vent steps with a final pressurization step. This cycle for storage of roasted coffee beans or grounds and removal of a portion of the roasted coffee beans or grounds to brew coffee can take place as many times as desired by the user.

For the mobile aspect of the apparatus, an airtight container assembly (10) that has completed the series of pressurization and vent steps and is in the optimum storage condition, can be removed from the control system (260) by lifting upwards on levers (136) which secure the airtight container assembly (10) to the control system (260). The levers (136) are then rotated via pivots (135) 90 degrees away from the airtight container assembly (10). The airtight container assembly (10) can now be removed from control system (260) and set aside for storage while filled with roasted coffee beans or grounds in the pressurized state. The airtight container assembly (10) can also be removed from the control system (260) in a non-pressurized state by turning the control switch (240) to the "Vent" position before beginning the procedure just described. This would be done in order to carry an empty airtight container assembly (10) to a coffee house for re-filling with fresh roasted coffee beans or grounds and processing to the optimum storage condition. The airtight container assembly (10) can then be placed back on the control system (260) and secured in place using the reverse of the removal steps described above.

CONCLUSION, RAMIFICATIONS, AND SCOPE

Accordingly, the reader will see that the apparatus with mobile reusable airtight container assembly which utilizes pressurized gas to maintain freshness of roasted coffee beans or grounds can significantly extend the time that freshness of roasted coffee beans or grounds in terms of aroma and taste is maintained while allowing for periodic opening of the airtight container assembly to remove portions of the roasted coffee beans or grounds to brew coffee as frequently as desired by the user. This is accomplished by incorporating design features into the apparatus which are capable of repeatedly creating the optimum storage condition that counteracts the key mechanisms responsible for the staling of fresh roasted coffee beans or grounds, namely the release of volatile aroma compounds and CO2 from the fresh roasted coffee beans or grounds and the oxidation of volatile aroma compounds and lipids within the fresh roasted coffee beans or grounds. The optimum storage condition being pressurized inert gas or CO2 gas and low residual oxygen and moisture concentrations. This is accomplished by providing an airtight container assembly and airtight lid along with means of repeatedly forming an airtight seal which will hold the inert gas or CO2 gas at pressures between 1.1 and 2.2 atmospheres. Furthermore, the apparatus has an electronically controlled valve and pressure switch system that can repeatedly execute an automated procedure consisting of multiple steps of pressurization with inert gas or CO2 gas and venting of the inert gas or CO2 gas along with air, with a final step of pressurization with inert gas or CO2 gas. This automated procedure enables the apparatus to consistently achieve the optimum storage condition of pressurized inert gas or CO2 gas with low residual oxygen and moisture concentrations within the airtight container assembly.

This optimum storage condition counteracts the staling mechanisms listed above as follows. The pressurized inert gas or CO2 gas environment within the airtight container assembly significantly reduces the diffusion forces acting upon the volatile aroma compounds and CO2 within the fresh roasted coffee beans or grounds, therefore reducing the rate of release of volatile aroma compounds and CO2 from the fresh roasted coffee beans or grounds. Due to the low residual oxygen and moisture concentrations, there is a significantly reduced availability of reactant, namely oxygen, which therefore reduces the rate of oxidation of volatile aroma compounds and lipids within the fresh roasted coffee beans or grounds. Also, since the current apparatus provides means to create the optimum storage condition for fresh roasted coffee beans or grounds of inert gas or CO2 gas at pressures between 1.1 and 2.2 atmospheres and low residual oxygen and moisture concentrations within the airtight container assembly upon closure after each time it is opened by the user to remove a portion of the roasted coffee beans or grounds in order to brew coffee, the apparatus can avoid the problem of rapid staling of the roasted coffee beans or grounds due to a new dose of air containing 21% oxygen and a moisture concentration that is dependent on the local relative humidity, being allowed into the airtight container assembly at each opening. Thus, for the coffee drinker who appreciates high quality aroma and taste in the final brew, the fresh aroma and taste of the roasted coffee beans or grounds required to produce such a high quality brew can be maintained for significantly longer periods of time than is possible with conventional storage means, by utilizing in the apparatus described herein.

Another advantage of the present apparatus is the unique two stage opening mechanism for the airtight lid. This allows for safe usage of the pressurized airtight container assembly in cases where a user forgets to vent the pressurized inert gas or CO2 gas before opening the airtight container assembly to remove a portion of the roasted coffee beans or grounds in order to brew coffee.

The mobile aspect of the airtight container assembly is enabled by incorporating a check valve into the design. This allows for the airtight container assembly to be removed from and replaced back on the control system as many times as desired by the user while internally maintaining the optimum storage condition of pressurized inert gas or CO2 gas with low residual oxygen and moisture concentrations. This has the advantage of allowing a user to store as much roasted coffee beans or grounds as desired by utilizing multiple airtight container assemblies. This has the further advantage of allowing the user to put newly purchased fresh roasted coffee beans or grounds into the optimal storage condition of pressurized inert gas or CO2 gas and low residual oxygen and moisture concentrations at the point of purchase. This is because coffee houses can have a control system and an inert gas or CO2 tank on their premises and offer to perform the automated sequence of pressurization and vent cycles with a final step of pressurization as a service for their customers.

Although the description above contains many specificities, these should not be construed as limiting the scope of the embodiments, but as merely providing illustrations of some of several embodiments. For example, the apparatus can have other shapes such as spherical and various sizes either smaller or larger.

Thus the scope of the embodiments should be determined by the appended claims and their legal equivalents, rather than by the examples given.

The invention claimed is:

1. An apparatus for preventing staling of roasted coffee beans or grounds due to oxidation and loss of volatiles, comprising:
   a control system, and
   an airtight container assembly, that is reusable, and is removably attached to said control system,
   said control system comprising:
     a tank, for holding pressurized inert gas or CO2,
     a control system interface plate,
     a pressure regulator,
     a gas delivery valve,
     a gas delivery line,
     a gas vent line,
     a vent valve,
     a pressure switch,
     an electronic controller, configured in communication with said pressure switch, said gas delivery valve, and said vent valve, to perform an automated process of a specific number of alternating pressurization and vent steps which progressively dilute the ambient oxygen within said airtight container assembly, by utilizing inert gas or CO2 gas from said tank to create a pressurized mixture of inert gas or CO2 gas and ambient air within said airtight container assembly at each of the pressurization steps, which is then released by each vent step, the final step being pressurization, resulting in the ambient oxygen being diluted to a level between 0.1%-4% and a storage pressure in the range of 1.1 to 2.2 atmospheres, within said airtight container assembly,
     two pivots, mounted on opposite sides of said control system interface plate,
     two levers, disposed at the tops of said two pivots, said levers are provided with an off center rotation point in order to tighten against the bottom section of said airtight container assembly when rotated downward, whereby securing said airtight container assembly to said control system at said control system interface plate, said airtight container assembly comprising:
an airtight container body,
an airtight lid,
an o-ring, for creating an airtight seal between said airtight lid and said airtight container body,
a hinge, connecting said airtight lid with said airtight container body,
a two stage opening mechanism, for opening and securing said airtight lid with said airtight container body, comprising:
a latch lever,
a latch hook,
a lever-latch connector rod,
a latch pivot guide,
a latch pivot pin,
latch mounting bands, said latch mounting bands having a stop ledge feature communicating with a slotted area in said latch lever and said lever-latch connector rod, thereby preventing an abrupt opening of said airtight lid if opened when said airtight container assembly is pressurized, characterized by lifting said latch lever in a first stage motion resulting in said lever-latch connector rod moving outward along said latch mounting bands until reaching said stop ledge feature, resulting in a small opening between said airtight lid and said airtight container body while maintaining connection of said latch hook with said airtight lid, for initial pressure release, followed by continuing to lift said latch lever in a second stage motion, said slotted area in said latch lever moves in a downward pivoting motion about said latch pivot pin, concurrently, said lever-latch connector rod moves further outward past said stop ledge feature, enabling said latch lever to be raised to a completely open position,
a check valve, comprising:
a check valve body,
a check valve bolt,
a check valve nut,
a check valve spring,
a check valve inner seal,
a check valve outer seal, wherein said check valve is disposed at the bottom of said airtight container body, and is opened by the force of a raised area on said control system interface plate communicating with said check valve bolt when said airtight container assembly is secured to said control system, whereby enabling two way gas flow and pressure monitoring within said airtight container assembly, and when said airtight container assembly is removed from said control system, said check valve closes, producing an airtight seal due to force from said check valve spring creating contact between said check valve inner seal and said check valve body, whereby protecting the contents of said airtight container assembly from the external atmosphere,
a filter, disposed on top of said check valve for preventing transport of debris, for example, coffee grounds into said control system.

2. The apparatus of claim 1, wherein said airtight container assembly has an opening of sufficient size to allow a user to easily fill said airtight container assembly with roasted coffee beans or grounds for storage and to easily remove a portion of the roasted coffee beans or grounds for brewing coffee.

3. The apparatus of claim 1, wherein said airtight container body is made of a rigid material which is able to safely tolerate an operating pressure range of 1.1-2.2 atmospheres, selected from the material group consisting of, polycarbonate, glass, aluminum, stainless steel or tinplate.

4. The apparatus of claim 1, wherein said airtight lid is made of a rigid material which is able to safely tolerate an operating pressure range of 1.1-2.2 atmospheres, selected from the material group consisting of, polycarbonate, glass, aluminum, stainless steel or tinplate.

* * * * *